United States Patent
Jeon et al.

(10) Patent No.: US 12,314,701 B2
(45) Date of Patent: May 27, 2025

(54) UPGRADABLE ELECTRONIC DEVICE AND METHOD FOR UPGRADING ELECTRONIC DEVICE

(71) Applicant: LG ELECTRONICS INC., Seoul (KR)

(72) Inventors: Hanbae Jeon, Seoul (KR); Moowoong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 18/093,062

(22) Filed: Jan. 4, 2023

(65) Prior Publication Data

US 2023/0214205 A1 Jul. 6, 2023

(30) Foreign Application Priority Data

Jan. 4, 2022 (KR) .......................... 10-2022-0001081

(51) Int. Cl.
*G06F 8/65* (2018.01)
*H04L 67/06* (2022.01)

(52) U.S. Cl.
CPC ................ *G06F 8/65* (2013.01); *H04L 67/06* (2013.01)

(58) Field of Classification Search
CPC ................................. G06F 8/65; H04L 267/06
USPC .................................................. 717/168–174
See application file for complete search history.

(56) References Cited

U.S. PATENT DOCUMENTS

| | | | | |
|---|---|---|---|---|
| 6,505,033 B1* | 1/2003 | Shinozaki | ............. | H04L 5/1438 455/557 |
| 6,976,251 B2* | 12/2005 | Meyerson | ................. | G06F 8/65 717/173 |
| 7,657,884 B2* | 2/2010 | Okonnen | .................. | G06F 8/65 717/177 |
| 8,469,824 B1* | 6/2013 | Farley | ........................ | F41J 5/02 434/21 |
| 8,594,850 B1* | 11/2013 | Gourlay | .................. | H04L 67/34 165/203 |
| 9,225,766 B2* | 12/2015 | Philip | .................... | H04L 67/025 |
| 9,470,444 B1* | 10/2016 | Takata | ..................... | F24F 11/38 |

(Continued)

FOREIGN PATENT DOCUMENTS

| | | |
|---|---|---|
| CN | 101034359 A | 9/2007 |
| CN | 111309362 A | 6/2020 |

(Continued)

OTHER PUBLICATIONS

Pishva et al, "Product-Based Security Model for Smart Home Appliances", IEEE, pp. 32-41 (Year: 2008).*

(Continued)

*Primary Examiner* — Anil Khatri
(74) *Attorney, Agent, or Firm* — KED & ASSOCIATES, LLP

(57) ABSTRACT

An upgradable electronic device is disclosed. The electronic device includes: a first communication unit for receiving data for upgrade from outside the electronic device; and a main controller for receiving the data from the first communication unit to retransmit the data or to perform a predetermined function using the data. The main controller transmits the data to a plurality of devices in a broadcasting manner and sequentially receives a receipt acknowledgment signal from the plurality of devices.

9 Claims, 9 Drawing Sheets

(56) References Cited

U.S. PATENT DOCUMENTS

| | | | |
|---|---|---|---|
| 9,735,831 B1 * | 8/2017 | Juntunen | H04J 3/0658 |
| 9,772,136 B2 * | 9/2017 | Shim | F25B 49/005 |
| 10,420,013 B2 | 9/2019 | Eller | |
| 10,623,509 B2 * | 4/2020 | Delinselle | H04L 43/0817 |
| 10,649,502 B2 | 5/2020 | Shin et al. | |
| 10,673,646 B1 * | 6/2020 | Shinar | H04W 4/12 |
| 10,728,237 B2 * | 7/2020 | DeBickes | G06F 21/57 |
| 10,791,001 B2 * | 9/2020 | Brian | H04L 12/4625 |
| 10,811,901 B2 * | 10/2020 | Bhageria | H02J 13/00034 |
| 11,212,388 B2 * | 12/2021 | Kim | H04L 12/282 |
| 2006/0106912 A1 * | 5/2006 | Kim | F24F 11/30 |
| | | | 709/203 |
| 2014/0376405 A1 * | 12/2014 | Erickson | H04L 12/2814 |
| | | | 370/254 |

FOREIGN PATENT DOCUMENTS

| | | |
|---|---|---|
| CN | 113203192 A | 8/2021 |
| JP | 2009-155377 | 7/2009 |
| KR | 10-2009-0043988 | 5/2009 |
| KR | 2009-0065904 A | 6/2009 |
| KR | 101257090 B1 | 4/2013 |
| KR | 2016-0021891 A | 2/2016 |
| KR | 101960736 B1 | 3/2019 |
| KR | 10-2019-0067764 A | 6/2019 |
| KR | 10-2019-0076685 A | 7/2019 |
| KR | 102056170 B1 | 12/2019 |

OTHER PUBLICATIONS

Chai et al, "Improvement and Implementation of IoT Device's Program Upgrade System on Cloud Platform", IEEE, pp. 81-85 (Year: 2022).*

Su et al, "Intelligent control of air conditioning in exhibition halls based on edge computing", ACM, pp. 1-5 (Year: 2023).*

Nepa et al, "Android-Based Mobile Application for Managing the Laboratory Air Conditioning Units", ACM, pp. 1-6 (Year: 2021).*

Athanasiadis, "An Intelligent Service Layer Upgrades Environmental Information", IEEE, pp. 1-6 (Year: 2006).*

International Search Report dated Apr. 26, 2023 issued in Application PCT/KR2023/000051.

Extended European Search Report dated May 8, 2023 issued in Application 23150172.7.

Korean Office Action dated Oct. 11, 2024 issued in Application 10-2022-0001081.

* cited by examiner

UPGRADABLE ELECTRONIC DEVICE AND METHOD FOR UPGRADING ELECTRONIC DEVICE

CROSS-REFERENCE TO RELATED APPLICATION

This application claims priority to and the benefit of Korean Patent Application No. 10-2022-0001081, filed in Korea on Jan. 4, 2022, the disclosure of which is incorporated herein by reference in its entirety.

BACKGROUND

1. Field

Embodiments of the present disclosure relate to an upgradable electronic device and a method for upgrading the electronic device.

2. Background

An electronic device includes a controller that controls operations of the electronic device. The controller controls the electronic device through execution of a specific program to implement functions desired by users.

After-sales service for electronic devices is limited to simple support, such as software debugging. Accordingly, a user who wants a new function needs to purchase a new electronic device. That is, an electronic device purchased by a user undergoes a significant decrease in residual value over time, which leads to user complaints.

Accordingly, many studies are being conducted on a method of improving existing functions of an electronic device and/or adding a new function to the electronic device through modification of the program, and some of such studies are being put into practice.

In order to modify the program, data including a program needs to be transmitted. However, it may take a lot of time to transmit such data, which becomes an obstacle in modifying the program.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
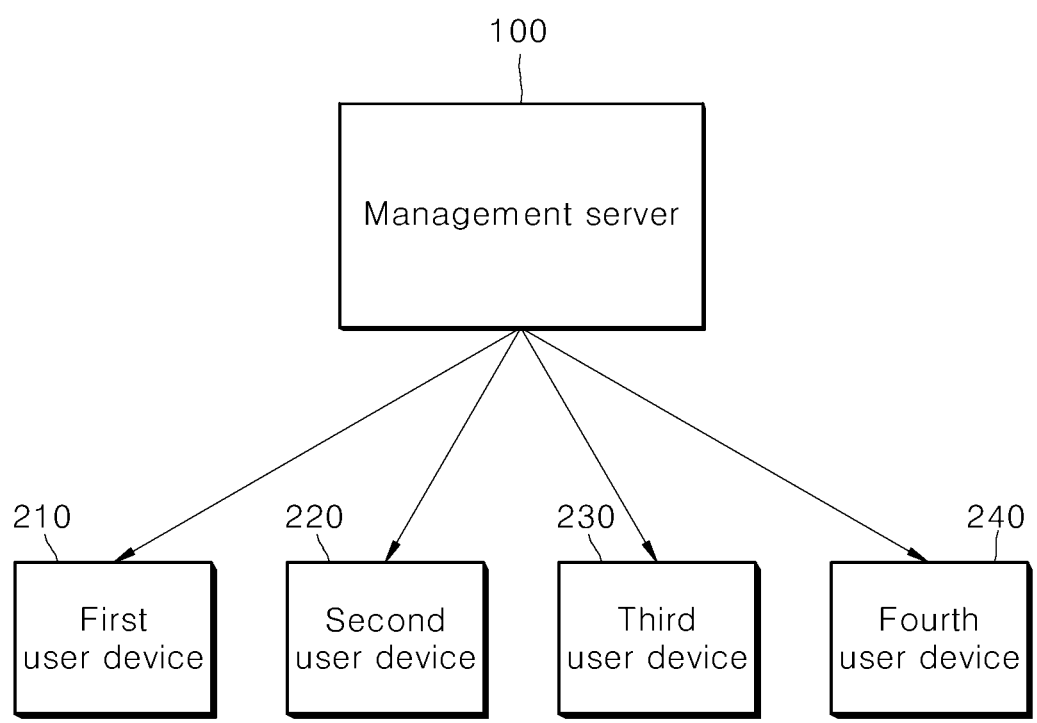
FIG. 1 is a schematic block diagram of a system for upgrading electronic devices according to one embodiment of the present disclosure.

The above and other objects, features, and advantages of the present disclosure may become apparent from the detailed description of the following embodiments in conjunction with the accompanying drawings. Description of known functions and constructions which may unnecessarily obscure the subject matter of the present disclosure may be omitted. Like components may be denoted by like reference numerals throughout the specification.

It will be understood that, although the terms "first", "second", and the like may be used herein to describe various elements and the like, these elements should not be limited by these terms. These terms are only used to distinguish one element from another element. Thus, unless stated otherwise, a first element discussed below could be termed a second element, or vice versa, without departing from the scope of the present disclosure.

In addition, when a component is referred to as being "connected to", "coupled to" or "joined to" another component, these components may be connected, coupled, or joined to each other directly or through another component, or intervening component(s) may be "interposed" therebetween.

Throughout the specification, unless stated otherwise, each element may be singular or plural in number.

As used herein, the singular forms "a", "an", and "the" are intended to include the plural forms as well, unless the context clearly indicates otherwise. Moreover, the terms "comprises", "comprising", "includes" and/or "including" when used in this specification, should not be construed to mean that a process, method, article, or apparatus comprising a list of elements or steps necessarily comprises all the elements or all the steps. Thus, such a process, method, article, or apparatus may be free from some of the elements or the steps, or may further include one or more other elements or steps.

Throughout the specification, the expression "A and/or B" means A, B, or A and B, unless stated otherwise, and the expression "C to D" means "greater than or equal to C and less than or equal to D", unless stated otherwise.

An upgradeable electronic device and a method for upgrading the electronic device according to some embodiments of the present disclosure may be described.

FIG. 1 is a schematic block diagram of a system for upgrading electronic devices according to an embodiment of the present disclosure. The system according to this embodiment may include a management server 100 and a plurality of user devices 210, 220, 230, 240 (or multiple user devices).

The management server 100 may store information about electronic devices to be upgraded and information about electronic devices owned by each user.

The information about electronic devices to be upgraded may include program data for a most recent version of each electronic device to be upgraded. In some embodiments, the information about electronic devices to be upgraded may include at least one of an identifier of each electronic device to be upgraded, program data for each previous version of the electronic device, and/or delta data derived from comparison between the program data for each previous version of the electronic device and the program data for the most recent version of the electronic device. Program data is data related to operation of the electronic device, and refers to data that can improve functions of the electronic device or add new functions to the electronic device. For example, when the electronic device is an air conditioner, program data may be data for a program for adjusting at least one of air volume, airflow direction, and/or indoor temperature, may be data for improving images displayed on a display module or for displaying a new image, and/or may be data related to voice information provided by a voice information module.

The information about electronic devices owned by each user may include a user identifier and an identifier of an electronic device associated with the user identifier.

The management server 100 may transmit data for upgrade of each of the user devices 210, 220, 230, 240. The data may include program data for a most recent version of a corresponding electronic device and/or delta data as described above. In some embodiments, the data transmitted by the management server 100 may include a set of instructions that need to be executed by each of the user devices 210, 220, 230, 240.

Each of the plurality of user devices 210, 220, 230, 240 may include at least one electronic device. The electronic device may include a variety of electronic devices, including a variety of home appliances, such as an air conditioner, an air purifier, a refrigerator, a washing machine, a steam closet, and a water purifier, mobile devices, such as a smartphone, and a variety of automotive electronic devices (for example, a device for autonomous driving, a device for controlling vehicle operation, and the like).

Each of the plurality of user devices 210, 220, 230, 240 may include at least one user terminal. The at least one electronic device may update program data in response to a file received from the management server 100 (i.e., a file including the delta data and/or the set of instructions).

In the following description, a home appliance may be an example of an electronic device to be upgraded. However, it will be understood that the present disclosure is not limited thereto.

Figure 2:
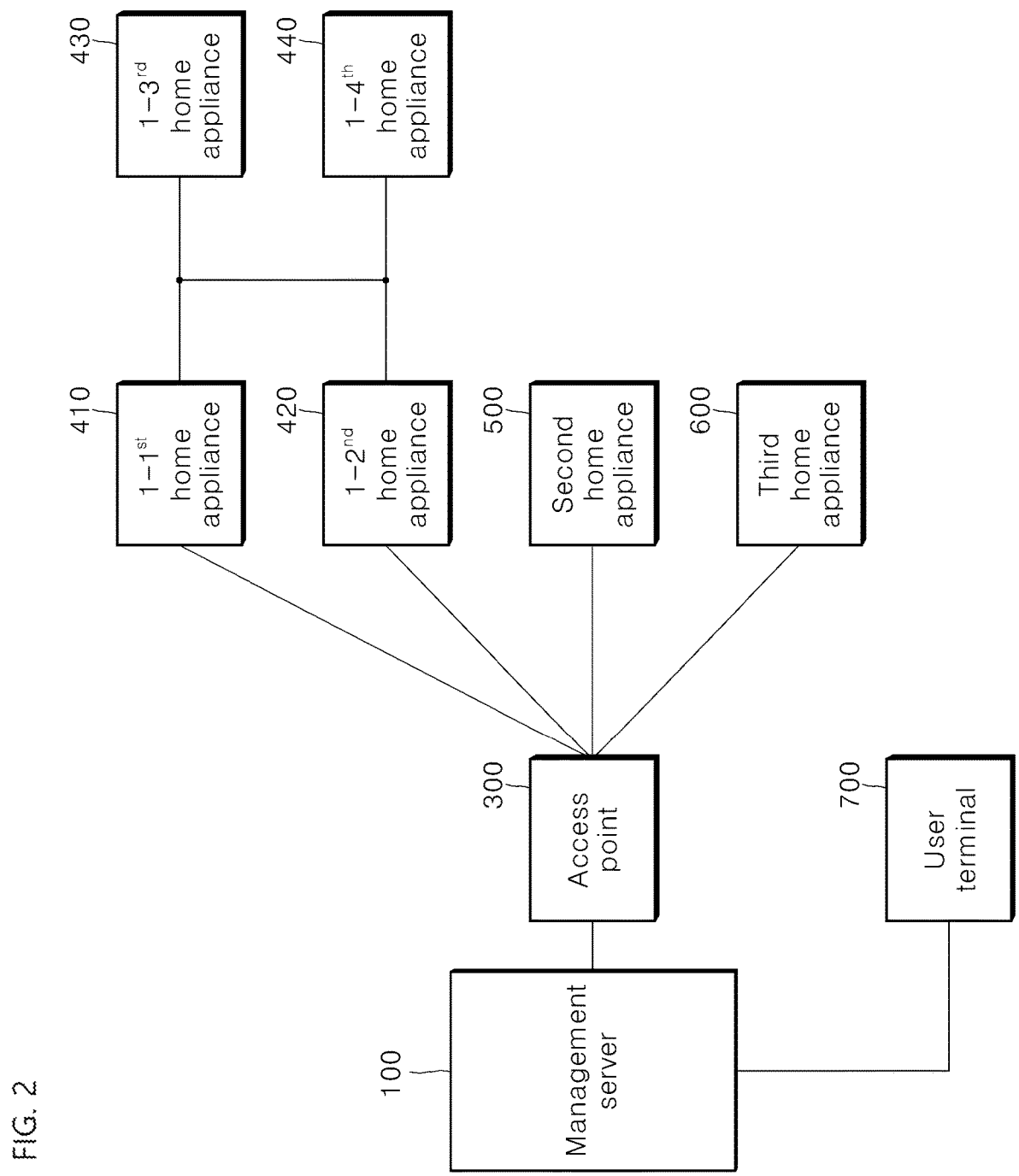
FIG. 2 is a schematic block diagram of a system for upgrading electronic devices according to one embodiment of the present disclosure, illustrating the user device of FIG. 1 in more detail.

FIG. 2 is a schematic block diagram of a system for upgrading electronic devices according to an embodiment of the present disclosure, illustrating the user device of FIG. 1 in more detail. The system according to this embodiment may include the management server 100, an access point 300, a plurality of home appliances 410, 420, 430, 440, 500, 600, and a user terminal 700. That is, each of the plurality of user devices 210, 220, 230, 240 of FIG. 1 may include at least one of the access point 300, the home appliances 410, 420, 430, 440, 500, 600, and the user terminal 700.

The management server 100 may have the same functions as described in FIG. 1.

The access point 300 may serve to relay communication between the management server 100 and the home appliances 410, 420, 500, 600. As one example, the access point 300 may be a Wi-Fi router.

Each of the plurality of home appliances 410, 420, 430, 440, 500, 600 may perform a unique function through execution of a corresponding program.

The home appliances 410, 420, 430, 440 may be individual units of a split-type home appliance, wherein the individual units each have a predetermined function and are connected to one another. For example, a 1-$1^{st}$ home appliance 410, a 1-$2^{nd}$ home appliance 420, and a 1-$3^{rd}$ home appliance 430 may be indoor units of an air conditioner, each of which controls one of indoor temperature, humidity, and air quality, and a 1-$4^{th}$ home appliance 440 may be an outdoor unit of the air conditioner. The 1-$4^{th}$ home appliance 400 may be an outdoor unit which is connected to the indoor units. Indoor air quality may include the concentration of fine dust and/or the concentration of chemicals that cause odors and the like. The 1-$1^{st}$ home appliance 410 and the 1-$2^{nd}$ home appliance 420 may include a communication module (for example, a Wi-Fi module or Wi-Fi device) for connection to the access point 300. Additionally, the 1-$1^{st}$ home appliance 410, the 1-$2^{nd}$ home appliance 420, the 1-$3^{rd}$ home appliance 430, and the 1-$4^{th}$ home appliance 440 may include a communication module for intercommunication. Each of the 1-$1^{st}$ home appliance 410, the 1-$2^{nd}$ home appliance 420, and the 1-$3^{rd}$ home appliance 430 may control at least one of indoor air temperature, humidity, and fine dust concentration through execution of a corresponding program. The 1-$4^{th}$ home appliance 440 may control operation of at least one of a compressor and a fan through execution of a corresponding program.

Each of the second home appliance 500 and the third home appliance 600 may be an independent home appliance. For example, each of the second home appliance 500 and the third home appliance 600 may be one of various home appliances such as a washing machine, an air purifier, a steam closet, and a refrigerator. Each of the second home appliance 500 and the third home appliance 600 may include a communication module (for example, a Wi-Fi module).

The user terminal 700 may be a mobile terminal of a user who owns the plurality of home appliances 410, 420, 430, 440, 500, 600.

In some embodiments, the access point 300 may be omitted. In this example, each of the home appliances 410, 420, 500, 600 may access the management server 100 via the Internet or the like. In this example, each of the home appliances 410, 420, 500, 600 may access the management server 100 via wired and/or electronic connection.

Figure 3:
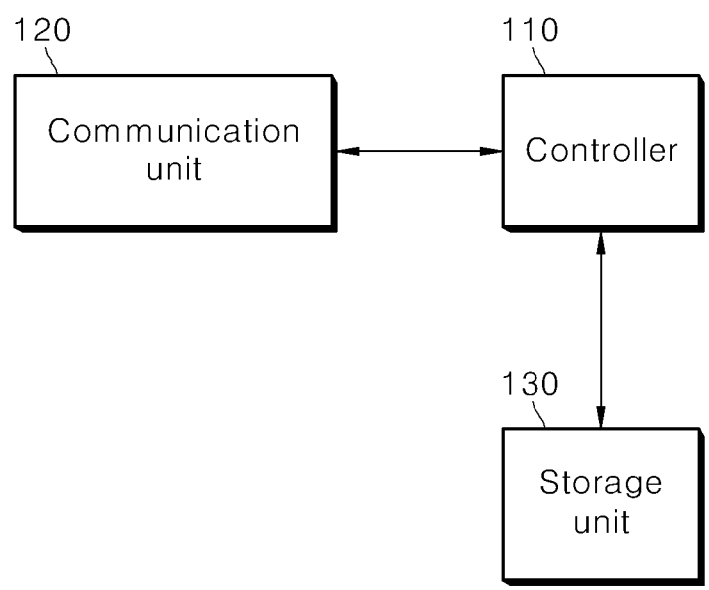
FIG. 3 is a schematic block diagram of a management server for upgrading electronic devices according to one embodiment of the present disclosure.

FIG. 3 is a schematic block diagram of a management server for upgrading electronic devices according to an embodiment of the present disclosure. Other embodiments and configurations may also be provided. The management server 100 may include a controller 110, a communication unit 120 (or a communication device), and a storage unit 130 (or a storage, a storage device and/or a memory). The above described components of the management server 100 may be structural components that include hardware.

The controller 110 may transmit (or provide) program data stored in the storage unit 130. The program data transmitted by the controller 110 may be program data for a most recent version of a corresponding home appliance. In some embodiments, the controller 110 may generate home appliance-specific delta data based on data stored in the storage unit 130, and may transmit (or provide) the delta data to the home appliances 410, 420, 500, 600 (FIG. 2) through the communication unit 120. In addition to the program data and/or the delta data, the controller 110 may transmit a set of instructions to be executed by a controller of each of the home appliances 410, 420, 500, 600 (FIG. 2).

The controller 110 may include at least one processing unit (or processing device) and/or a memory. The processing unit may include, for example, a central processing unit (CPU), a graphics processing unit (GPU), a microprocessor, an application-specific integrated circuit (ASIC), and a field-programmable gate array (FPGA), and may have multiple cores. The memory may be a volatile memory (for example, RAM and the like), a nonvolatile memory (for example, ROM, flash memory, and the like), or a combination thereof. The controller 110 is a structural component that includes hardware The communication unit 120 may transmit signals outside the management server under the control of the controller 110. The communication unit 120 may receive signals from outside the management server, and may transmit (or provide) the received signals to the controller 110. The communication unit 120 may transmit/receive signals via wired and/or electronic connection. The communication unit 120 may include a modem, a network interface card (NIC), an integrated network interface, a radio frequency transmitter/receiver, an infrared port, a USB port, and/or any other interface for communication with other computing devices.

Under control of the controller 110, the storage unit 130 may store data received through the communication unit 120 and/or data processed by the controller 110. For example, the storage unit 130 may store at least one of a user identifier, an identifier of a home appliance associated with the user identifier, program data for each version of the home appliance, and delta data derived from comparison between program data for each previous version of the home appliance and program data for a most recent version of the home appliance.

Figure 4:
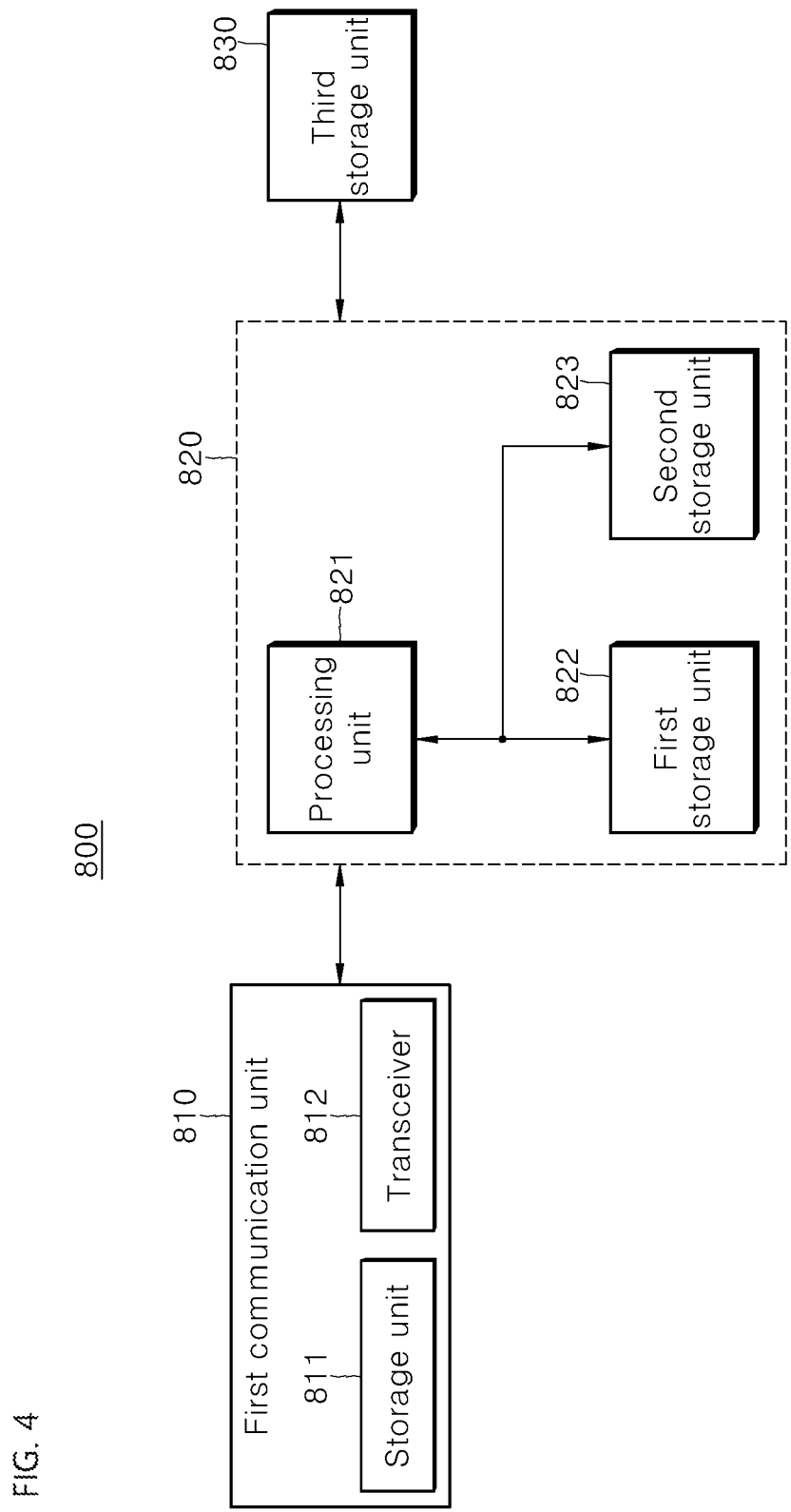
FIG. 4 is a schematic block diagram of an upgradable electronic device according to one embodiment of the present disclosure.

FIG. 4 is a schematic block diagram of an upgradable electronic device according to an embodiment of the present disclosure. Other embodiments and configurations may also be provided. The electronic device according to this embodiment may include a first communication unit 810 (or a first communication device), a controller 820, and a third storage unit 830. The first communication unit 810 may include a storage unit 811 and a transceiver 812, and the controller 820 may include a processing unit 821 (or a processor or a processing device), a first storage unit 822, and a second storage unit 823. Each of the home appliances 410, 420, 500, 600 (FIG. 2) may include the components shown in FIG. 4. In some embodiments, some of the first storage unit 822, the second storage unit 823 and the third storage unit 830 may be omitted from the electronic device according to this embodiment. Each of the storage units may be referred to as a storage device, a storage and/or a memory. The controller 820 and/or the processing unit 821 may be a structural device that includes at least hardware.

The first communication unit 810 may receive data from the management server 100 and may transmit (or provide) the received data to the controller 820. The data received from the management server 100 may include at least one of program data, delta data (as described above), and an instruction to be executed by the controller 820. The first communication unit 810 may include a radio frequency transmitter/receiver, an infrared port, a USB port, and/or any other interface. For example, the first communication unit 810 may include a near-field communication module that transmits/receives signals according to a communication protocol such as Wi-Fi or Bluetooth.

The storage unit 811 may store data received from the management server 100. The storage unit 811 may be a nonvolatile memory. For example, the storage unit 811 may be a flash memory.

The transceiver 812 may transmit (or provide) data stored in the storage unit 811 to the controller 820.

The controller 820 may store a program for implementing functions of a corresponding home appliance, and may execute the stored program to cause the home appliance to perform a specific function. The controller 820 may update the stored program in response to data received from the first communication unit 810.

The processing unit 821 may include a central processing unit (CPU), a graphics processing unit (GPU), a microprocessor, an application-specific integrated circuit (ASIC), a field-programmable gate array (FPGA), and/or the like, and may have multiple cores.

The first storage unit 822 may be a nonvolatile memory. As an example, the first storage unit 822 may be a flash memory. As one example, the first storage unit 822 may store the program described above.

The second storage unit 823 may be a volatile memory. For example, the second storage unit 823 may be a RAM. A portion of program data stored in the first storage unit 822 may be loaded into the second storage unit 823, and the program data stored in the second storage unit 823 may be written to a specific area of the first storage unit 822.

The third storage unit 830 may be a nonvolatile memory. The third storage unit may be one selected from among a flash memory, a magnetic storage, and an optical storage. The program for implementing functions of the home appliance may also be stored in the third storage unit 830.

Figure 5:
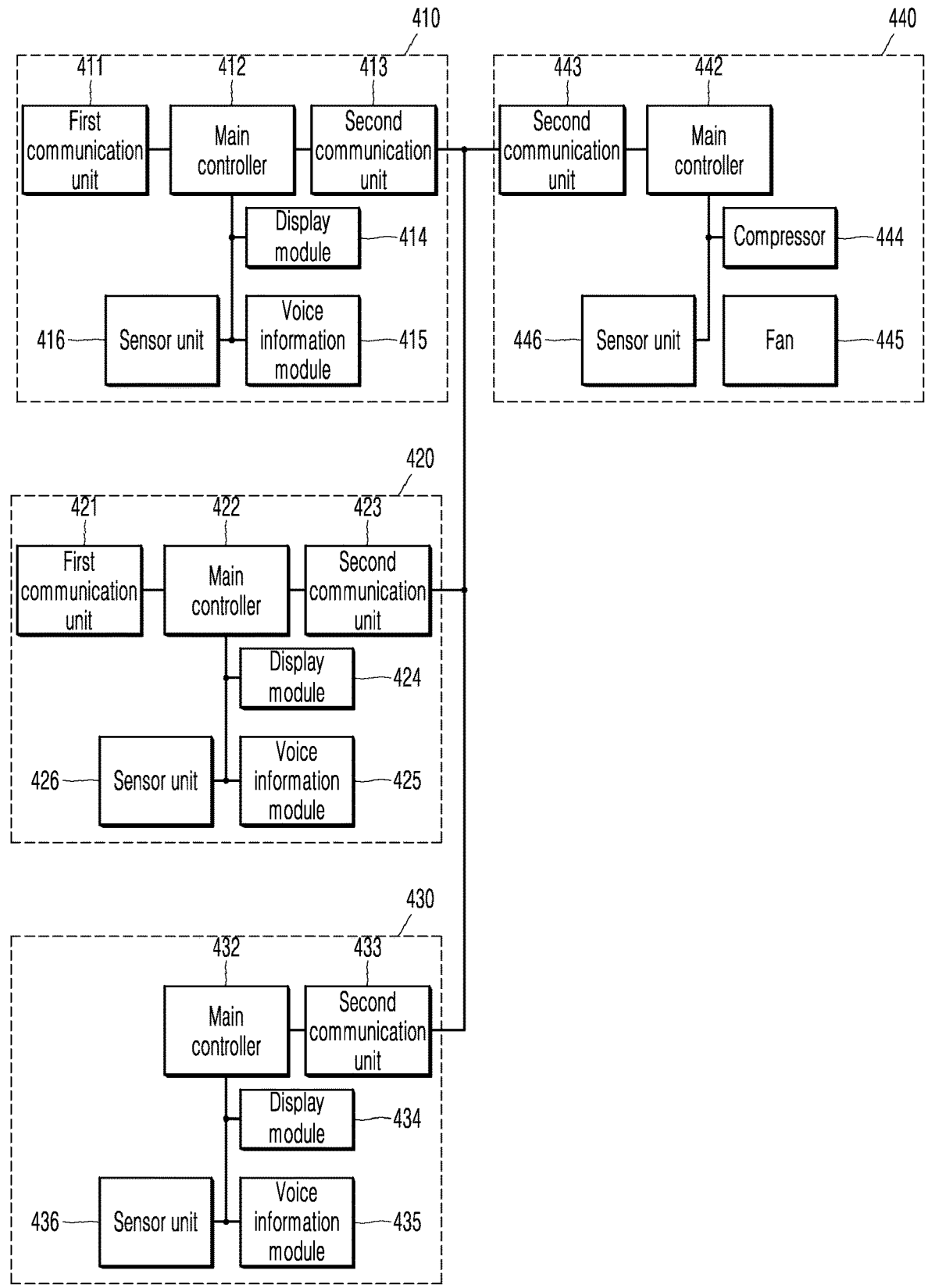
FIG. 5 is a schematic block diagram of an upgradeable split-type home appliance including multiple individual units according to one embodiment of the present disclosure.

FIG. 5 is a schematic block diagram of an upgradeable split-type home appliance including a plurality of individual units according to an embodiment of the present disclosure. Other embodiments and configurations may also be provided. As described above, the $1\text{-}1^{st}$ home appliance 410, the $1\text{-}2^{nd}$ home appliance 420, and the $1\text{-}3^{rd}$ home appliance 430 may be indoor units of an air conditioner (or an air conditioner system), and the $1\text{-}4^{th}$ home appliance 440 may be an outdoor unit of the air conditioner (or the air conditioner system). Additionally, as described with respect to FIG. 2, the $1\text{-}1^{st}$ home appliance 410 and the $1\text{-}2^{nd}$ home appliance 420 may access the management server 100 via the access point 300 and/or the Internet.

The $1\text{-}1^{st}$ home appliance 410 may include a first communication unit 411, a main controller 412, and a second communication unit 413. In at least one embodiment, the $1\text{-}1^{st}$ home appliance 410 may include at least one of a display module 414 (or a display device or a display), a voice information module 415, and a sensor unit 416 (or a sensor device or a sensor). Each of the communication units may be referred to as a communication device. Each of the above described components of the $1\text{-}1^{st}$ home appliance may be a structure component and may include hardware.

The first communication unit 411 may receive data from the management server 100 and may transmit (or provide) the received data to the main controller 412. The first communication unit 411 may have the same configuration as the first communication unit 810 (FIG. 4), and/or may perform the same functions as the first communication unit 810.

The main controller 412 may receive data from the first communication unit 411 and may transmit (or provide) the received data to the second communication unit 413. When the data received from the first communication unit 411 is data used by the display module 414 and/or the voice information module 415, the main controller 412 may also transmit the data to the display module 414 and/or the voice information module 415. The main controller 412 may have the same configuration as the controller 820 (FIG. 4), and/or may perform the same functions as the controller 820.

The second communication unit 413 may transmit/receive data to/from at least one of the $1\text{-}2^{nd}$ home appliance 420, the $1\text{-}3^{rd}$ home appliance 430, and the $1\text{-}4^{th}$ home appliance 440. The second communication unit 413 may transmit/receive data via asynchronous serial communication. The second communication unit 413 is to transmit/receive data using asynchronous serial communication. Asynchronous serial communication allows straightforward implementation of hardware of a corresponding home appliance. Additionally, the second communication unit 413 may transmit/receive data at a rate of 4,800 bps to 4 Mbps. Preferably, the second communication unit 413 transmits/receives data at a rate of 9,600 bps. As described above, the 1-1$^{st}$ home appliance 410 may be an indoor unit of an air conditioner, and the 1-4$^{th}$ home appliance 440 may be an outdoor unit of the air conditioner. Considering a distance between indoor and outdoor units of an air conditioner in an installation environment and surroundings thereof, the communication speed within the above range can ensure reliable communication while shortening the time required for data transmission. For example, the second communication unit 413 may include a universal asynchronous receiver/transmitter (UART), and may transmit/receive data via RS485 communication. The second communication unit 413 may include a buffer to temporarily store data.

The display module 414 may visually display various types of information for user convenience. For example, the display module 414 may display at least one of information related to operation of a corresponding home appliance, information related to the condition of the home appliance, and/or other daily life-related information. The display module 414 may be operated under the control of the main controller 412, or may include a separate display controller. Predetermined data may be transmitted from the management server to drive the display module 414. The display module 414 may receive the data via the main controller 412.

The voice information module 415 (or the voice information device) may provide various types of voice information for user convenience. Similar to the display module 414, the voice information module 415 may provide at least one of voice information related to operation of a corresponding home appliance, voice information related to the condition of the home appliance, and other daily life-related voice information. The voice information module 415 may be operated under the control of the main controller 412, or may include a separate voice controller. Predetermined data may be transmitted from the management server to drive the voice information module 415. The voice information module 415 may receive the data via the main controller 412.

The sensor unit 416 may acquire information related to operation of a corresponding home appliance. For example, when the home appliance is an air conditioner, the sensor unit 416 may detect at least one of indoor temperature, the temperature of air discharged from the air conditioner, indoor humidity, and the temperature and/or pressure of a circulating refrigerant. The sensor unit 416 may include at least one sensor.

The 1-2$^{nd}$ home appliance 420 may have substantially the same configuration as the 1-1$^{st}$ home appliance 410. That is, a first communication unit 421, a main controller 422, a second communication unit 423, a display module 424 (or a display or a display device), a voice information module 425, and a sensor unit 426 (or a sensor or a sensor device) may be substantially the same as the first communication unit 411, the main controller 412, the second communication unit 413, the display module 414, the voice information module 415, and the sensor unit 416, respectively. Each of the communication units may be referred to as a communication device. Each of the above described components (including the main controller) of the 1-2$^{nd}$ home appliance may be a structure component and may include hardware.

The 1-3$^{rd}$ home appliance 430 may be substantially the same as the 1-1$^{st}$ home appliance except that the 1-3$^{rd}$ home appliance does not include a first communication unit as described above. That is, a main controller 432, a second communication unit 433, a display module 434 (or a display or a display device), a voice information module 435, and a sensor unit 436 (or a sensor or a sensor device) may be substantially the same as the main controller 412, the second communication unit 413, the display module 414, the voice information module 415, and the sensor unit 416, respectively. Each of the communication units may be referred to as a communication device. Each of the above described components (including the main controller) of the 1-3$^{rd}$ home appliance may be a structure component and may include hardware.

A main controller 442 and a second communication unit 443 of the 1-4$^{th}$ home appliance 440 may be substantially the same as the main controller 412 and the second communication unit 413 of the 1-1$^{st}$ home appliance 410, respectively. As described above, the 1-4$^{th}$ home appliance 440 may be an outdoor unit of an air conditioner. In this example, the 1-4$^{th}$ home appliance 440 may include a compressor 444, a fan 445, and the like. The main controller 442 may control the compressor 444 and/or the fan 445 using a program contained in data received from the 1-1$^{st}$ home appliance 410. The 1-4$^{th}$ home appliance 440 may also include a sensor unit 446 (or a sensor or a sensor device) that acquires information related to operation of a corresponding home appliance. When the 1-4$^{th}$ home appliance 440 is an outdoor unit of an air conditioner, the sensor unit 446 may detect at least one of the pressure or temperature of a refrigerant, outdoor temperature, and outdoor humidity. The sensor unit 446 may include at least one sensor. Each of the communication units may be referred to as a communication device. Each of the above described components (including the main controller) of the 1-4$^{th}$ home appliance may be a structure component and may include hardware.

Although an air conditioner including one outdoor unit and three indoor units connected to the outdoor unit is shown as an example of an electronic device to be upgraded in FIG. 2 and FIG. 5, the number of indoor units connected to one outdoor unit (for example, the 1-4$^{th}$ home appliance 440) may be adjusted as needed. For example, for an air conditioner used in a large building, dozens or more of indoor units may be connected to one outdoor unit.

Figure 6:
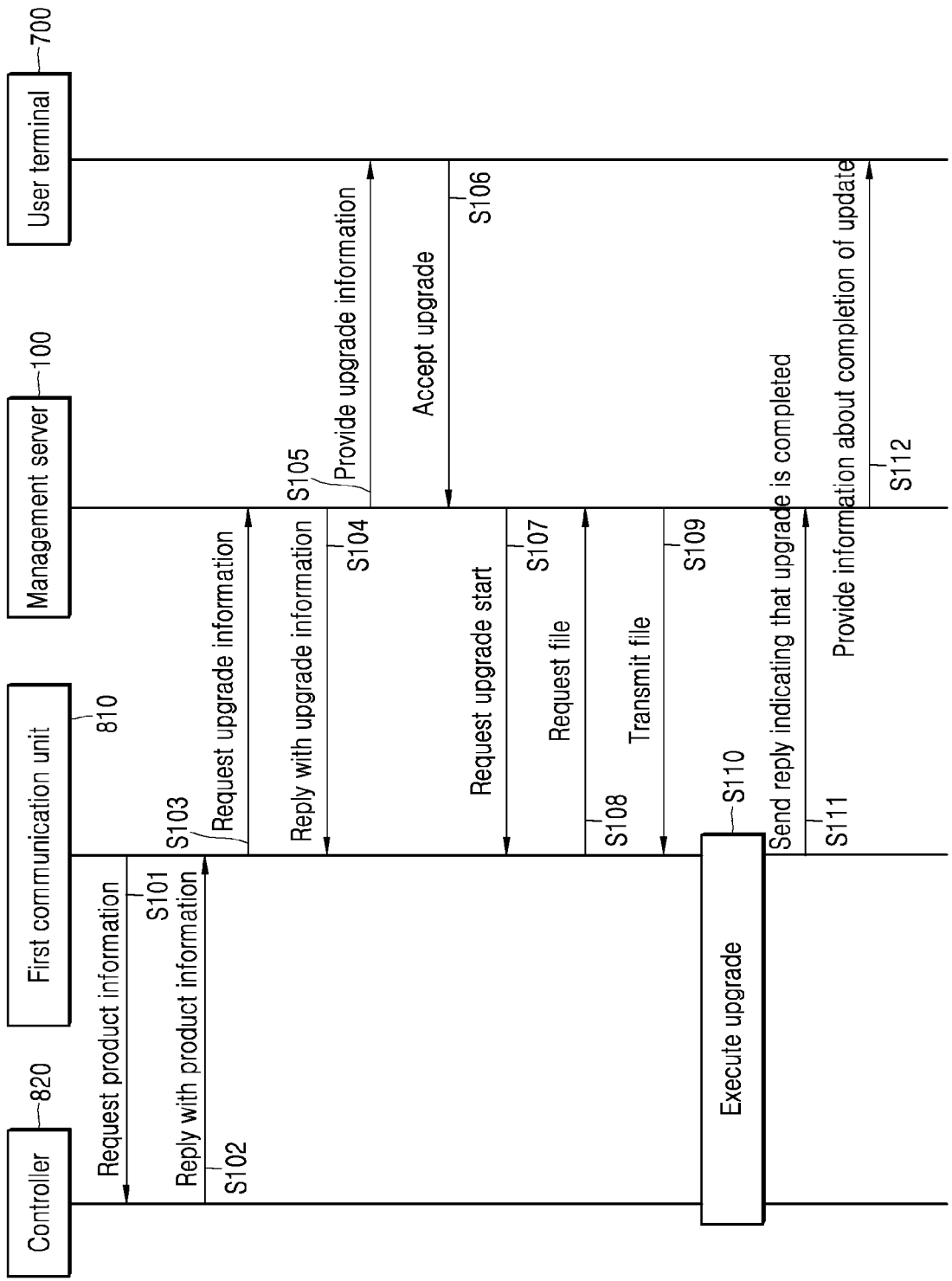
FIG. 6, FIG. 7, and FIG. 8 are flow diagrams illustrating the overall operation of a method for upgrading home appliances according to respective embodiments of the present disclosure.

FIG. 6 is a flow diagram illustrating the overall operation of a method for upgrading home appliances according to an embodiment of the present disclosure. Other embodiments, configurations and operations may also be provided.

The first communication unit 810 may request home appliance-related information (product information) from the controller 820 (step S101). The product information may be a home appliance identifier. The home appliance identifier may include at least one of a serial number and a model name of a corresponding home appliance. In some embodiments, in step S101, the first communication unit 810 may request the home appliance-related information from the controller 820 in response to a request for the home appliance-related information from the management server 100.

In response to the request for product information, the controller 820 may reply to the first communication unit 810 with the home appliance-related information (for example, the home appliance identifier) (step S102).

The first communication unit 810 may request information about whether there are upgrades to be made to the home appliance from the management server 100 (step S103). The first communication unit 810 may transmit the home appliance-related information (for example, the home appliance identifier) to the management server 100. The first communication unit 810 may further transmit user information to the management server 100. The first communication unit 810 may transmit/receive data to/from the management server 100 through a repeater. The repeater may be the access point of FIG. 2.

The management server 100 may reply to the first communication unit 810 with upgrade information (step S104). The upgrade information may include at least one of information about whether there are upgrades to be made to the corresponding home appliance, which is identified based on the home appliance-related information, and information about the content or details of the upgrades. The management server 100 may determine whether to upgrade the home appliance. Additionally, the management server 100 may determine what upgrade method to use. For example, the management server 100 may determine what upgrade method to use by identifying details of the upgrades. Examples of upgrade methods may include full upgrade, differential upgrade, and background upgrade.

The management server 100 may also provide the upgrade information to the user terminal 700 (step S105). The management server 100 may retrieve information about a user of the home appliance from the storage unit 130 (FIG. 3), or may receive user information from the first communication unit 810.

When the user accepts upgrade of the home appliance using the user terminal 700, information about upgrade acceptance may be transmitted from the user terminal 700 to the management server 100 (step S106).

Alternatively, the user may accept upgrade of the home appliance using an input/output unit of the home appliance, instead of using the user terminal 700.

In response to user acceptance of upgrade, the management server 100 may send an upgrade start request to the first communication unit 810 (step S107). In some embodiments, the management server 100 may determine what upgrade method to use in this step/operation. How to determine what upgrade method to use may be easily understood by referring to the description of step S104. In response to the upgrade start request from the management server 100, the first communication unit 810 may send a file transmission request to the management server 100 (step S108).

In response to the file transmission request from the first communication unit 810, the management server 100 may transmit a file including data for upgrade of the home appliance to the first communication unit 810 (step S109). The data may include at least one of program data for a most recent version of the home appliance, delta data, and/or a set of instructions.

The first communication unit 810 and the controller 820 may update a program for the home appliance using the file received from the management server 100 (step S110).

When upgrade is completed, the first communication unit 810 may send a reply indicating completion of upgrade to the management server 100 (step S111).

In response to the reply from the first communication unit 810 that indicates completion of upgrade, the management server 100 may provide information about completion of upgrade to the user terminal (step S112).

As described above, the controller 820 (FIG. 6) may be the main controller 412 of FIG. 5, and the first communication unit 810 (FIG. 6) may be the first communication unit 411 of FIG. 5.

Figure 7:
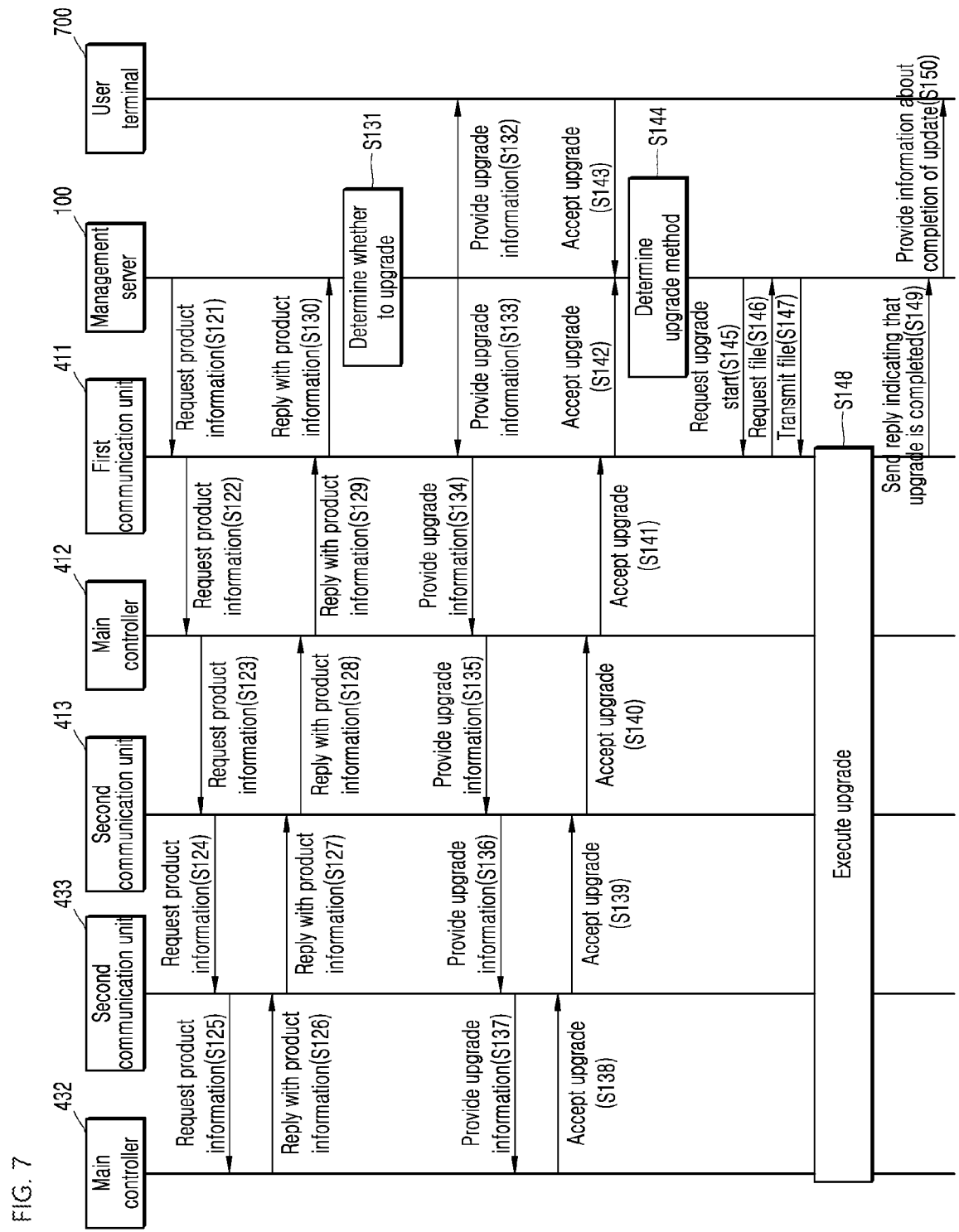

FIG. 7 is a flow diagram illustrating an overall operation of a method for upgrading home appliances according to an embodiment of the present disclosure. Other embodiments, configurations, and operations may also be provided.

The management server 100 may request information about the 1-3$^{rd}$ home appliance 430 from the first communication unit 411 of the 1-1$^{st}$ home appliance 410 (step S121). Similar to that described in FIG. 6, the information about the 1-3$^{rd}$ home appliance 430 may be an identifier of the 1-3$^{rd}$ home appliance 430. The identifier of the 1-3$^{rd}$ home appliance 430 may include at least one of a serial number and a model name of the 1-3$^{rd}$ home appliance 430.

The request for product information transmitted from the management server 100 to the first communication unit 411 may be delivered to the main controller 432 of the 1-3$^{rd}$ home appliance 430 through the main controller 412 of the 1-1$^{st}$ home appliance 410, the second communication unit 413 of the 1-1$^{st}$ home appliance 410, and the second communication unit 433 of the 1-3$^{rd}$ home appliance 430 (steps S122 to S125).

In response to the request for product information, the main controller 432 of the 1-3$^{rd}$ home appliance 430 may reply to the management server 100 with the information about the 1-3$^{rd}$ home appliance 430 (for example, the identifier of the 1-3$^{rd}$ home appliance 430) through the second communication unit 433 of the 1-3$^{rd}$ home appliance 430, the second communication unit 413 of the 1-1$^{st}$ home appliance 410, the main controller 412 of the 1-1$^{st}$ home appliance 410, and the first communication unit 411 of the 1-1$^{st}$ home appliance 410 (steps S126 to S130).

The management server 100 may reply with the upgrade information described above. More specifically, the management server 100 may provide the upgrade information to the main controller 432 of the 1-3$^{rd}$ home appliance 430 through the first communication unit 411 of the 1-1$^{st}$ home appliance 410, the main controller 412 of the 1-1$^{st}$ home appliance 410, the second communication unit 413 of the 1-1$^{st}$ home appliance 410, and the second communication unit 433 of the 1-3$^{rd}$ home appliance 430 (steps S133 to S137). The management server 100 may also provide the upgrade information to the user terminal 700 (step S132). The management server 100 may retrieve information about a user of a corresponding home appliance from the storage unit 130 (FIG. 3), or may receive user information from the first communication unit 411.

The management server 100 may receive an acceptance of upgrade. More specifically, the management server 100 may receive the acceptance of upgrade from the main controller 432 of the 1-3$^{rd}$ home appliance 430 through the second communication unit 433 of the 1-3$^{rd}$ home appliance 430, the second communication unit 413 of the 1-1$^{st}$ home appliance 410, the main controller 412 of the 1-1$^{st}$ home appliance 410, and the first communication unit 411 of the 1-1$^{st}$ home appliance 410. For example, the 1-3$^{rd}$ home appliance 430 may display the upgrade information on a display unit (for example, a display panel or LED) and then may send the acceptance of upgrade to the management server 100 in response to user input received through an input unit (i.e., a touchpad, a switch, or a remote controller). Alternatively, when the user accepts upgrade using the user terminal 700, information about upgrade acceptance may be transmitted from the user terminal 700 to the management server 100 (step S143).

The management server 100 may determine what upgrade method to use (step S144). For example, the management server 100 may determine what upgrade method to use by identifying the details of upgrades to be made. Examples of upgrade methods may include full upgrade, differential upgrade, and background upgrade.

In response to user acceptance of upgrade, the management server 100 may send an upgrade start request to the first communication unit 411 (step S145).

In response to the upgrade start request from the management server 100, the first communication unit 411 may send a file transmission request to the management server 100 (step S146).

In response to the file transmission request from the first communication unit 810, the management server 100 may transmit a file including data for upgrade of the corresponding home appliance to the first communication unit 411 (step S147). The upgrade data may include program data for a most recent version of the home appliance, delta data, and/or a set of instructions.

At least one of the first communication unit 411 of the 1-1$^{st}$ home appliance 410, the main controller 412 of the 1-1$^{st}$ home appliance 410, and the second communication unit 413 of the 1-1$^{st}$ home appliance 410, the second communication unit 433 of the 1-3$^{rd}$ home appliance 430, and the main controller 432 of the 1-3$^{rd}$ home appliance 430 may upgrade the home appliance using the received file (step S148). A process of upgrading the home appliance may include at least one of transmitting data and replacing data stored in the home appliance with data in the received file.

When upgrade is completed, the first communication unit 411 may send a reply indicating completion of upgrade to the management server 100 (step S149).

In response to the reply from the first communication unit 411 that indicates completion of upgrade, the management server 100 may provide information about completion of upgrade to the user terminal (step S150).

Figure 8:
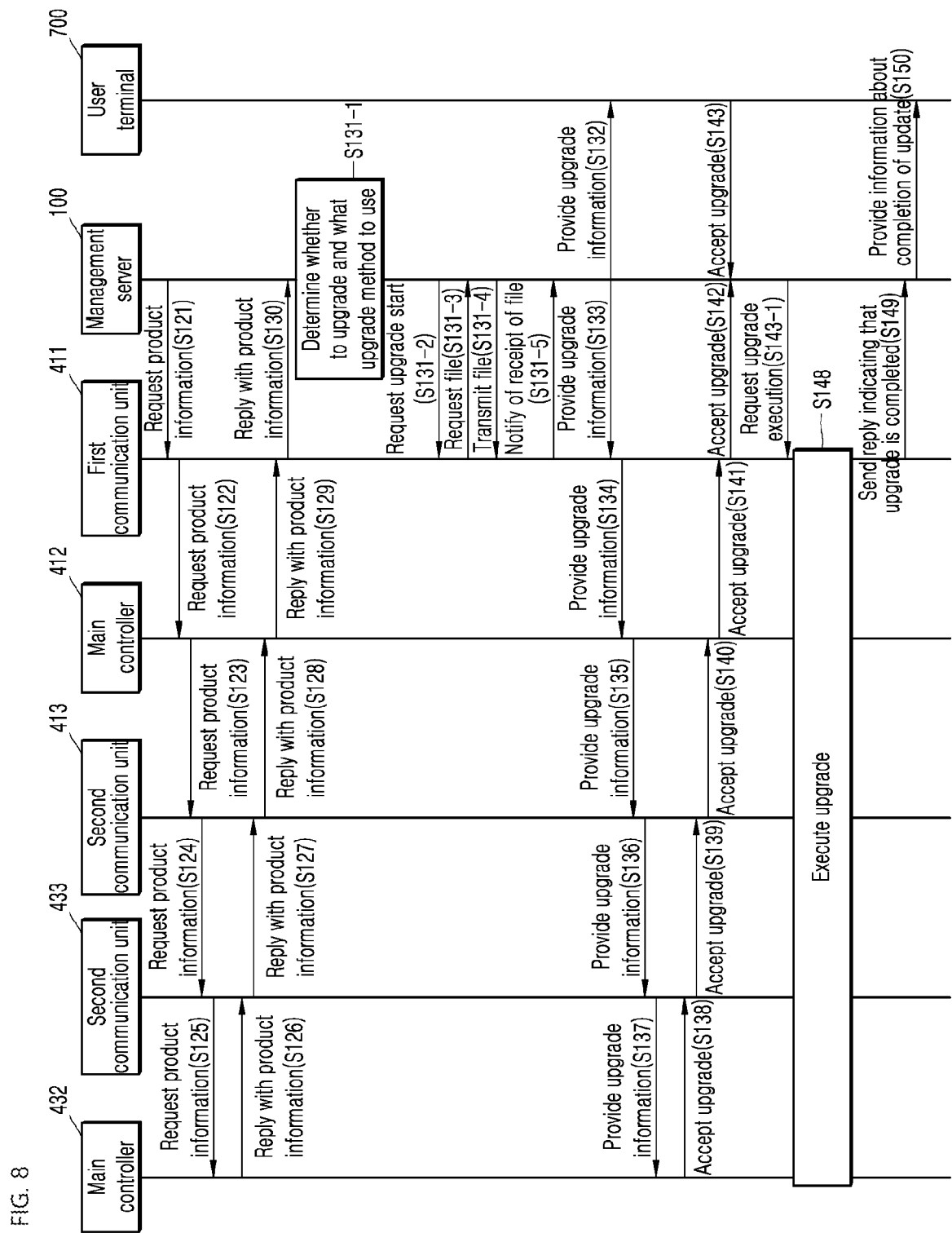

FIG. 8 is a flow diagram illustrating the overall operation of a method for upgrading home appliances according to an embodiment of the present disclosure. Other embodiments, configurations and operations may also be provided.

In FIG. 8, processes/operations indicated by the same reference numerals as in FIG. 7 are the same as those described in FIG. 7. That is, the embodiment shown in FIG. 8 may be substantially the same as that described in FIG. 7 except that data for upgrade of a corresponding home appliance is transmitted to the 1-3$^{rd}$ home appliance 430 before receipt of an acceptance of upgrade from a user.

More specifically, when the management server 100 receives home appliance-related information from the 1-3$^{rd}$ home appliance 430, the management server 100 may determine whether to upgrade a corresponding home appliance and what upgrade method to use (step S131-1). Step S131-1 may be the same as step S131 and step S144 of FIG. 7.

The management server 100 may send an upgrade start request to the first communication unit 411 (step S131-2). In response to the upgrade start request from the management server 100, the first communication unit 411 may send a file transmission request to the management server 100 (step S131-3). In response to the file transmission request from the first communication unit 411, the management server 100 may transmit a file including data for upgrade of the home appliance to the first communication unit 411 (step S131-4). Steps S131-2 to S131-4 may be the same as steps S145 to S147 of FIG. 7, respectively.

In response to user acceptance of upgrade, the management server 100 may send an upgrade execution request to the first communication unit 411. In response to the upgrade execution request from the management server 100, at least one of the first communication unit 411 of the 1-1$^{st}$ home appliance 410, the main controller 412 of the 1-1$^{st}$ home appliance 410, the second communication unit 413 of the 1-1$^{st}$ home appliance 410, the second communication unit 433 of the 1-3$^{rd}$ home appliance 430, and the main controller 432 of the 1-3$^{rd}$ home appliance 430 may upgrade the home appliance using the received file (step S148).

Figure 9:
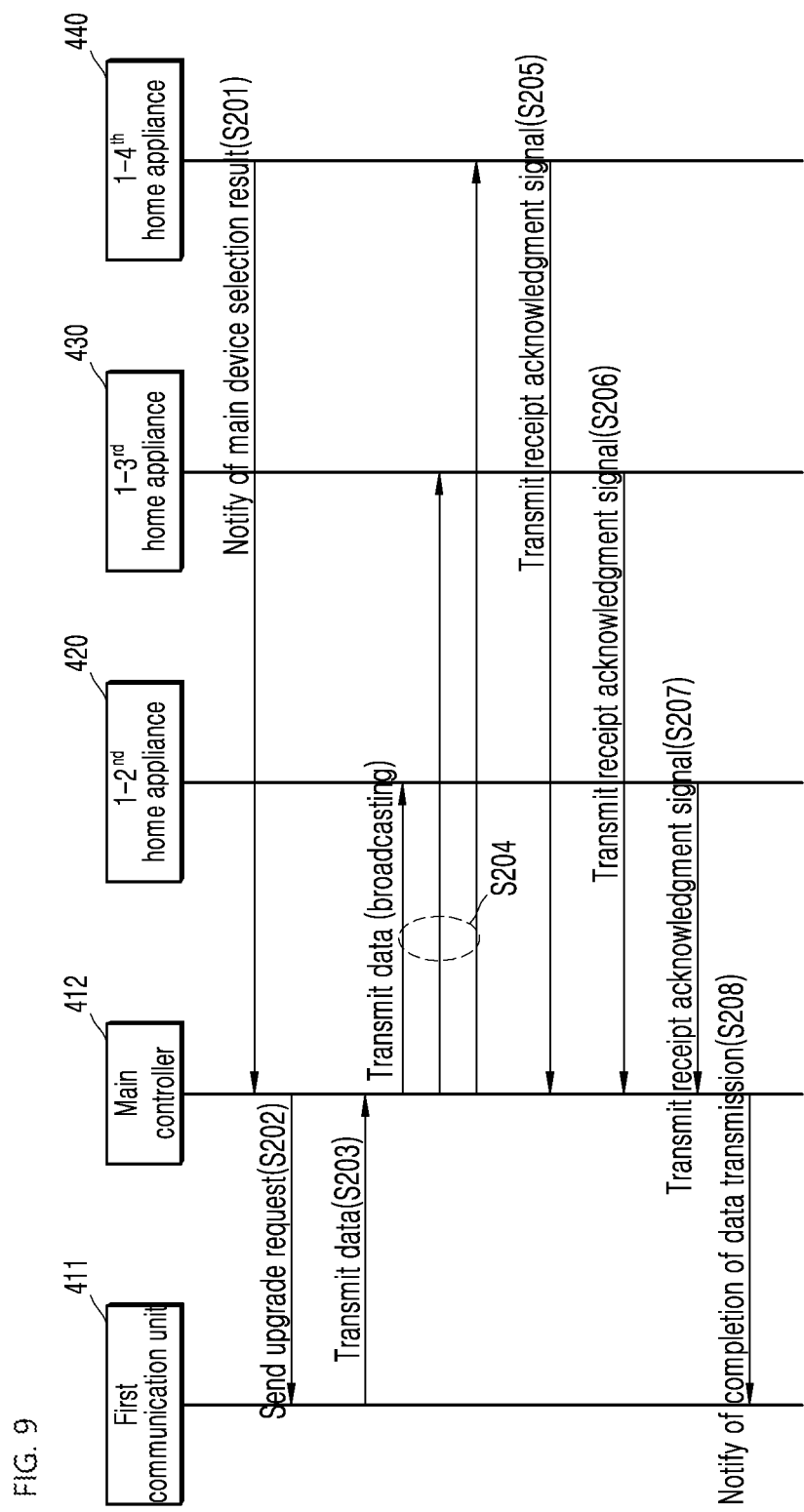
FIG. 9 is a flow diagram of a process of transmitting program data in a method of upgrading electronic devices according to one embodiment of the present disclosure.

FIG. 9 is a flow diagram of a process of transmitting program data in a method of upgrading electronic devices according to an embodiment of the present disclosure, illustrating data transmission from the 1-1$^{st}$ home appliance 410 to the 1-2$^{nd}$ home appliance 420, the 1-3$^{rd}$ home appliance 430, and the 1-4$^{th}$ home appliance 440. Other embodiments, configurations, and operations may also be provided.

Referring to FIG. 5 and FIG. 9, the process of transmitting program data in the method of upgrading electronic devices according to this embodiment may be described.

First, one of multiple home appliances connected to one another may select a main device and may notify the selected home appliance of the selection result (step S201). When the 1-1$^{st}$ to 1-4$^{th}$ home appliances 410 to 440 are individual units of a split-type air conditioner, the 1-4$^{th}$ home appliance 440, which is an outdoor unit, may select the main device. This is because every indoor unit needs to be connected to the outdoor unit, and the outdoor unit has information about every indoor unit. Among the 1-1$^{st}$ home appliance 410, the 1-2$^{nd}$ home appliance 420, and the 1-3$^{rd}$ home appliance 430, a home appliance capable of receiving data from the management server 100 may be selected as the main device by the 1-4$^{th}$ home appliance 440.

When there are multiple home appliances capable of receiving data from the management server 100, the main device may be selected based on the order in which the corresponding home appliances are connected to the 1-4$^{th}$ home appliance 440 or through performance comparison between respective first communication units and second communication units of the corresponding home appliances.

For example, the 1-4$^{th}$ home appliance 440 may assign unique internal addresses to the 1-1$^{st}$ home appliance 410, the 1-2$^{nd}$ home appliance 420, and the 1-3$^{rd}$ home appliance 430 in the order in which the corresponding home appliances are connected to the 1-4$^{th}$ home appliance 440. The 1-4$^{th}$ home appliance 440 may select the main device using the unique internal addresses. More specifically, the 1-4$^{th}$ home appliance 440 may select a home appliance assigned with the first of the unique internal addresses (for example, No. 1 or No. 0) as the main device. In some embodiments, the 1-4$^{th}$ home appliance 440 may assign unique internal addresses according to which port each of the 1-1$^{st}$ home appliance 410, the 1-2$^{nd}$ home appliance 420, and the 1-3$^{rd}$ home appliance 420 is connected.

Alternatively, the 1-4$^{th}$ home appliance 440 may select the main device by receiving information about the performance of respective first and/or second communication units of the 1-1$^{st}$ home appliance 410, the 1-2$^{nd}$ home appliance 420, and the 1-3$^{rd}$ home appliance 420 from the corresponding home appliances, followed by identifying which one of the first and/or second communication units has the best performance (for example, fastest data transmission speed). In some embodiments, the 1-4$^{th}$ home appliance 440 may identify the performance of the respective second communication units of the 1-1$^{st}$ home appliance 410, the 1-2$^{nd}$ home appliance 420, and the 1-3$^{rd}$ home appliance 420 by checking data transmission to/from each of the 1-1$^{st}$ home appliance 410, the 1-2$^{nd}$ home appliance 420, and the 1-3$^{rd}$ home appliance 420.

In the following description, it is assumed that the 1-1$^{st}$ home appliance 410 is selected as the main device.

The main controller 412 of the 1-1$^{st}$ home appliance 410 may send information indicating that the 1-1$^{st}$ home appliance 410 has been selected as the main device and/or an upgrade request to the first communication unit 411 (step S202).

The first communication unit 411 of the 1-1$^{st}$ home appliance 410 may receive data for upgrade from the management server 100 and may transmit (or provide) the data to the main controller 412 of the 1-1$^{st}$ home appliance 410 in the same manner as described in FIG. 6 to FIG. 8 (step S203). When the size of the data received from the management server 100 is greater than a unit size, the first communication unit 411 may divide the received data into multiple data segments of the unit size and then may sequentially transmit the data segments to the main controller 412. As one example, the unit size may be 256 bytes.

The main controller 412 may transmit the received data (or data segments) to at least two of the 1-$2^{nd}$ home appliances 420, the 1-$3^{rd}$ home appliances 430, and the 1-$4^{th}$ home appliances 440 in a broadcasting manner (step S204). In some embodiments, the 1-$1^{st}$ home appliance 410 may be an indoor unit of a split-type air conditioner and the main controller 412 of the 1-$1^{st}$ home appliance 410 may transmit the received data to the other indoor units (i.e., the 1-$2^{nd}$ home appliance 420 and the 1-$3^{rd}$ home appliance 430) connected to an outdoor unit (i.e., the 1-$4^{th}$ home appliance 440) to which the 1-$1^{st}$ home appliance 410 is connected.

Transmission in a broadcasting manner means that the same data is simultaneously transmitted to two or more home appliances. The data transmitted from the main controller 412 may be delivered to the respective main controllers 422, 432, 442 of the corresponding home appliances through the second communication unit 413 of the 1-$1^{st}$ home appliance 410 and the respective second communication units 423, 433, 443 of the corresponding home appliances. In some embodiments, in step S204, one data segment may be transmitted, or multiple data segments may be sequentially transmitted.

Among the 1-$2^{nd}$ home appliances 420, the 1-$3^{rd}$ home appliance 430, and the 1-$4^{th}$ home appliance 440, home appliances having received the data may sequentially transmit a receipt acknowledgment signal to the 1-$1^{st}$ home appliance 410 (steps S205, S206, and S207). The main controller 412 of the 1-$1^{st}$ home appliance 410 may transmit a request signal requesting transmission of the receipt acknowledgment signal in a broadcasting manner, and in response to the request signal, the corresponding home appliances may transmit the receipt acknowledgment signal.

The 1-$2^{nd}$ home appliance 420, the 1-$3^{rd}$ home appliance 430, and the 1-$4^{th}$ home appliance 440 may transmit the receipt acknowledgment signal in a predetermined order. The order of transmission of the receipt acknowledgment signal may be predetermined by the 1-$4^{th}$ home appliance 440 when the 1-$4^{th}$ home appliance 440 selects the main device. Alternatively, the order of transmission of the receipt acknowledgment signal may be predetermined by the 1-$1^{st}$ home appliance 410 selected as the main device.

A method of determining the order of transmission of the receipt acknowledgment signal may be described in detail using an air conditioner as an example. For the air conditioner (or the air conditioner system), the data may be transmitted to the 1-$2^{nd}$ home appliance 420 and the 1-$3^{rd}$ home appliance 430 (i.e., indoor units). Additionally, the 1-$2^{nd}$ home appliance 420 and the 1-$3^{rd}$ home appliance 430 (i.e., indoor units) are connected to the 1-$4^{th}$ home appliance 440 (that is, an outdoor unit), as described above. Unique internal numbers may be assigned to the 1-$2^{nd}$ home appliance 420 and the 1-$3^{rd}$ home appliance 430 (i.e., indoor units) in the order in which the corresponding home appliances are connected to the 1-$4^{th}$ home appliance 440. That is, the unique internal numbers may be sequentially assigned. Each of the 1-$2^{nd}$ home appliance 420 and the 1-$3^{rd}$ home appliance 430 (i.e., indoor units) may determine its own waiting time based on the unique internal number assigned thereto. More specifically, each of the 1-$2^{nd}$ home appliance 420 and the 1-$3^{rd}$ home appliance 430 (i.e., indoor units) may have a waiting time set to the product of unit waiting time and the unique internal number assigned thereto. For example, assuming that the unique internal number assigned to the 1-$2^{nd}$ home appliance 420 is 2, the unique internal number assigned to the 1-$3^{rd}$ home appliance 420 is 3, and unit waiting time is 1 second, the 1-$2^{nd}$ home appliance 420 may have a waiting time of 2 seconds and the 1-$3^{rd}$ home appliance 430 may have a waiting time of 3 seconds. Then, when the 1-$1^{st}$ home appliance 410 transmits a request signal requesting a receipt acknowledgment signal, each of the 1-$2^{nd}$ home appliance 420 and the 1-$3^{rd}$ home appliance 430 (i.e., indoor units) may transmit the receipt acknowledgment signal when its own waiting time elapses after receipt of the request signal.

Alternatively, each of the 1-$2^{nd}$ home appliance 420 and the 1-$3^{rd}$ home appliance 430 (i.e., indoor units) may transmit the receipt acknowledgment signal after transmitting a line occupation signal. More specifically, when the 1-$1^{st}$ home appliance 410 transmits the request signal, one of the 1-$2^{nd}$ home appliance 420 and the 1-$3^{rd}$ home appliance 430 (i.e., indoor units) may transmit the first line occupation signal in a broadcasting manner. Then, the other home appliances having received the line occupation signal may wait for unit waiting time and the home appliance having transmitted the line occupation signal may transmit the receipt acknowledgment signal in unit waiting time. Upon lapse of the unit waiting time, one of the home appliances having yet to transmit the receipt acknowledgment signal may transmit a line occupation signal and then may transmit the receipt acknowledgment signal in the same manner as described above.

When the main controller 412 receives the receipt acknowledgment signal from every home appliance, the main controller 412 may notify the first communication unit 411 of completion of data transmission (step S208).

Although the above embodiment of the air conditioner illustrates the example in which one of the indoor units is selected as the main device, it will be understood that the present disclosure is not limited thereto. That is, the outdoor unit may serve as the main device. For example, when a determination is made by the outdoor unit that there is no suitable indoor unit for functioning as the main device among the indoor units connected thereto or that every indoor unit is in a state of being unable to receive data from the management server, the outdoor unit may serve to receive data from the management server and to transmit the received data to the indoor units connected thereto. To this end, the outdoor unit (for example, the 1-$4^{th}$ home appliance 440) may further include a communication unit for communication with the management server. In some embodiments, after one indoor unit (for example, the 1-$1^{st}$ home appliance 410) transmits data for upgrade to the outdoor unit (for example, the 1-$4^{th}$ home appliance 440), the outdoor unit (for example, the 1-$4^{th}$ home appliance 440) transmits the data to the other indoor units in a broadcasting manner. In addition, in this example, the corresponding indoor units may sequentially transmit the receipt acknowledgment signal to the outdoor unit. A receipt acknowledgment signal transmission operation of each of the indoor units may be the same as described in FIG. 9.

Although not shown, when the data is divided into multiple data segments before transmission, the aforementioned operation shown in FIG. 9 may be repeated until the entirety of the data is transmitted. That is, the first communication unit 411 notified of completion of transmission of one data segment may transmit the next data segment to the main controller 412. When abnormal data transmission is detected after the first communication unit 411 receives the receipt acknowledgment signal, the first communication unit 411 may retransmit corresponding data.

Additionally, the data transmission process shown in FIG. 9 may be more effectively used when there are several home appliances upgradable using the same data. For example, for an air conditioner including several (in some embodiments, dozens or more of) indoor units connected to one outdoor unit, one indoor unit selected as the main device may transmit data to the other indoor units in a broadcasting manner and may receive receipt acknowledgment signals from the other indoor units in a time-division manner, as shown in FIG. 9, thereby shortening the time required for data transmission.

Embodiments of the present disclosure may provide an apparatus and method for upgrading the function of an electronic device more conveniently.

Embodiments of the present disclosure may provide an apparatus and method capable of reducing the time required to upgrade an electronic device.

The above and other objects and advantages of the present disclosure will become apparent from the detailed description of the following embodiments in conjunction with the accompanying drawings. In addition, it will be readily understood that the objects and advantages of the present disclosure can be realized by features set forth in the appended claims or combinations thereof.

An electronic device and a method according to embodiments of the present disclosure may provide a process of transmitting data for upgrade of the electronic device, in which a first electronic device selected as a main device transmits the data to a plurality of second electronic devices in a broadcasting manner and the second electronic devices sequentially transmit a receipt acknowledgment signal to the first electronic device.

In accordance with one aspect of the present invention, there is provided an electronic device including: a first communication unit receiving data for upgrade from outside the electronic device; and a main controller receiving the data from the first communication unit to retransmit the data or to perform a predetermined function using the data, wherein the main controller transmits the data to a plurality of devices in a broadcasting manner and sequentially receives a receipt acknowledgment signal from the a plurality of devices.

In one embodiment, the first communication unit may include a Wi-Fi communication module.

In one embodiment, the electronic device may further include: a second communication unit receiving the data from the main controller, transmitting the data to the plurality of devices, receiving the receipt acknowledgment signal from the plurality of devices, and transmitting the receipt acknowledgment signal to the main controller.

In one embodiment, the second communication unit may include an asynchronous serial communication module.

In accordance with another aspect of the present invention, there is provided an air conditioner including: a plurality of indoor units; and an outdoor unit connected to the plurality of indoor units.

In one embodiment, the outdoor unit may select a first indoor unit among the plurality of indoor units as a main device.

The first indoor unit may receive data for upgrade from outside the air conditioner and may transmit the data to at least two data-receiving devices in a broadcasting manner, the at least two data-receiving devices being selected from among the outdoor unit and at least one second indoor unit among the plurality of indoor units other than the first indoor unit.

In addition, the data-receiving devices may sequentially transmit a receipt acknowledgment signal to the first indoor unit.

In one embodiment, the first indoor unit may include: a first communication unit receiving the data from outside the air conditioner; and a second communication unit transmitting the data to the data-receiving devices and receiving the receipt acknowledgment signal from the data-receiving devices, the second communication unit transmitting/receiving the data in a different manner than the first communication unit.

In one embodiment, the second communication unit may have a lower data transmission rate than the first communication unit.

In one embodiment, the second indoor unit may include at least two second indoor units.

In one embodiment, the outdoor unit may assign a unique internal number to each of the first indoor unit and the second indoor units.

In one embodiment, the second indoor units may sequentially transmit the receipt acknowledgment signal based on the unique internal number.

In one embodiment, the first indoor unit may transmit a request signal requesting transmission of the receipt acknowledgment signal to the second indoor units, and each of the second indoor units may transmit the receipt acknowledgment signal in response to the request signal.

In one embodiment, each of the second indoor units may determine its own waiting time based on the internal unique number assigned thereto and unit waiting time and may transmit the receipt acknowledgment signal when its own waiting time elapses after receipt of the request signal.

In accordance with a further aspect of the present invention, there is provided a method for upgrading an electronic device including a first electronic device and a plurality of data-receiving devices connected to the first electronic device, the method including: receiving, by the first electronic device, data for upgrade from outside the electronic device; transmitting, by the first electronic device, the data to the data-receiving devices in a broadcasting manner; and transmitting, by the data-receiving devices, a receipt acknowledgment signal to the first electronic device in a sequential manner.

In one embodiment, the first electronic device may be a first indoor unit of an air conditioner and the data-receiving devices may include at least two selected from among an outdoor unit connected to the first indoor unit and at least one second indoor unit connected to the outdoor unit.

In one embodiment, the method may further include: selecting, by the outdoor unit, the first indoor unit as a main device responsible for data transmission.

The electronic device and the method according to embodiments of the present disclosure can ensure easy upgrade of electronic devices.

In addition, the electronic device and the method according to embodiments of the present disclosure can ensure reduction in amount of time required to upgrade electronic devices.

The above and other effects of the present disclosure will become apparent from the following detailed description of the present disclosure.

Although some exemplary embodiments have been described herein, it should be understood by those skilled in the art that these embodiments are given by way of example only, and that various modifications, variations, and alterations can be made without departing from the spirit and scope of the present disclosure. In addition, although advantageous effects provided by a certain configuration are not clearly described in description of the exemplary embodiments, it should be noted that expectable effects of the corresponding configuration should be acknowledged.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   a plurality of indoor units; and
   an outdoor unit to connect to the plurality of indoor units and configured to select a first indoor unit, from among the plurality of indoor units, as a main device,
   wherein the first indoor unit is configured to receive, from outside the air conditioner, data for upgrade, and to transmit the data to at least two data-receiving devices in a broadcasting manner,
   wherein the at least two data-receiving devices being selected from among the outdoor unit and at least two second indoor units, from among the plurality of indoor units other than the first indoor unit, and
   the at least two data-receiving devices to sequentially transmit a receipt acknowledgment signal to the first indoor unit,
   wherein the outdoor unit is configured to assign a unique internal number to each of the first indoor unit and the at least two second indoor units,
   wherein the at least two second indoor units sequentially transmit the receipt acknowledgment signal based on the assigned unique internal numbers, and
   wherein each of the at least two second indoor units is configured to determine a waiting time thereof based on the unique internal number assigned thereto and a unit waiting time, and to transmit the receipt acknowledgment signal when the waiting time elapses after receipt of a request signal.

2. The air conditioner according to claim 1, wherein the first indoor unit comprises:
   a first communication device configured to receive the data for upgrade from external of the air conditioner; and
   a second communication device configured to transmit the data to the at least data-receiving devices and to receive the receipt acknowledgment signal from the at least data-receiving devices,
   wherein the second communication device is to receive the data in a different manner than the first communication device, and the second communication device is to transmit data in a different manner than the first communication device.

3. The air conditioner according to claim 2, wherein the first communication device includes a wi-fi module to receive data.

4. The air conditioner according to claim 2, wherein the second communication device is to transmit or receive data using asynchronous serial communication.

5. The air conditioner according to claim 2, wherein a data transmission rate of the second communication device is less than a data transmission rate of the first communication device.

6. The air conditioner according to claim 1, wherein the first indoor unit is configured to transmit a request signal requesting transmission of the receipt acknowledgment signal to the at least two second indoor units, and each of the at least two second indoor units is configured to transmit the receipt acknowledgment signal in response to the request signal.

7. A method for upgrading an air conditioner that includes a first indoor unit and a plurality of data-receiving devices comprising at least two selected from among an outdoor unit connected to the first indoor unit and at least two second indoor units connected to the outdoor unit, the method comprising:
   assigning, by the outdoor unit, a unique internal number to each of the first indoor unit and the at least two second indoor units,
   receiving, by the first indoor unit, data for upgrade from outside the air conditioner;
   transmitting, by the first indoor unit, the data to the plurality of data-receiving devices in a broadcasting manner; and
   receiving, by the first indoor unit, a receipt acknowledgment signal from each of the plurality of data-receiving devices in a sequential manner,
   wherein the receiving, by the first indoor unit, a receipt acknowledgment signal comprises sequentially transmitting, by the at least two second indoor units, the receipt acknowledgment signal to the first indoor unit based on the assigned unique internal numbers, and
   wherein each of the at least two second indoor units is configured to determine a waiting time thereof based on the unique internal number assigned thereto and a unit waiting time, and to transmit the receipt acknowledgment signal when the waiting time elapses after receipt of a request signal.

8. The method according to claim 7, comprising:
   selecting, by the outdoor unit, the first indoor unit as a main device responsible for data transmission.

9. The method according to claim 8, wherein the first indoor unit includes a first communication device configured to receive the data for upgrade from outside of the air conditioner; and the first indoor unit includes a second communication device configured to transmit the data to the plurality of data-receiving devices and to receive the receipt acknowledgment signal from the plurality of data-receiving devices.

* * * * *